United States Patent
Trimberger

(10) Patent No.: US 9,584,329 B1
(45) Date of Patent: Feb. 28, 2017

(54) PHYSICALLY UNCLONABLE FUNCTION AND HELPER DATA INDICATING UNSTABLE BITS

(71) Applicant: Xilinx, Inc., San Jose, CA (US)

(72) Inventor: Stephen M. Trimberger, Incline Village, NV (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 14/553,734

(22) Filed: Nov. 25, 2014

(51) Int. Cl.
*G06F 12/14* (2006.01)
*H04L 9/32* (2006.01)

(52) U.S. Cl.
CPC .................. *H04L 9/3278* (2013.01)

(58) Field of Classification Search
CPC . H04L 9/3278; H04L 9/3271; H04L 2209/34; G11C 7/24; G11C 5/148; H03K 19/003; H04W 12/12; H04W 12/04; H04W 12/06; H04W 12/08
USPC ..................... 713/194; 380/44; 726/2, 26, 34
See application file for complete search history.

(56) References Cited

U.S. PATENT DOCUMENTS

| 8,386,990 | B1* | 2/2013 | Trimberger | ........... H01L 23/544 257/798 |
| 9,279,850 | B1 | 3/2016 | Pedersen | |
| 2013/0194886 | A1* | 8/2013 | Schrijen | ................... G06F 7/588 365/226 |
| 2014/0042442 | A1* | 2/2014 | Bruley | .................... H01L 22/34 257/48 |
| 2014/0327468 | A1* | 11/2014 | Pfeiffer | ................ H03K 19/003 326/8 |

OTHER PUBLICATIONS

Lec_28 (2011). Retrieved Dec. 11, 2015 from http://www.ece.rice.edu/~fk1/classes/ELEC528/Lec_28_528_FPGAfingerprint.pdf.*
Platonov (May 2013). SRAM-Based Physical Unclonable Function on an Atmel ATmega Microcontroller. Retrieved Dec. 11, 2015 from http://www.acm-spy.cz/wp-content/uploads/2014/05/acmspy2013_submission_35.pdf.*
Specification and drawings for U.S. Appl. No. 14/553,755, filed Nov. 25, 2014, Trimberger.
Specification and drawings for U.S. Appl. No. 13/867,429, filed Apr. 22, 2013, Trimberger et al.
Specification and drawings for U.S. Appl. No. 13/867,456, filed Apr. 22, 2013, Trimberger.
Specification and drawings for U.S. Appl. No. 13/867,574, filed Apr. 22, 2013, Trimberger et al.
Specification and drawings for U.S. Appl. No. 13/875,156, filed May 1, 2013, Trimberger.
IEEE, *Proceedings of the IEEE, Special Issue, Trustworthy Hardware*, Aug. 2014, pp. 1-158, IEEE, Piscataway, New Jersey, USA.
Suh, G. Edward et al., "Physically Unclonable Functions for Device Authentication and Secret Key Generation," *Proc. of the 44th Annual Design Automation Conference*, Jun. 4, 2007, pp. 9-14, ACM, New York, New York, USA.

* cited by examiner

*Primary Examiner* — Brian Shaw
(74) *Attorney, Agent, or Firm* — LeRoy D. Maunu

(57) ABSTRACT

Approaches for using a physically unclonable function (PUF) are described. A selector map is used to indicate stable and unstable bits in a PUF value that is generated by a PUF circuit. The stable bits of the PUF value generated by the PUF circuit may be selected for use by an application, and the unstable bits ignored.

15 Claims, 8 Drawing Sheets

PHYSICALLY UNCLONABLE FUNCTION AND HELPER DATA INDICATING UNSTABLE BITS

TECHNICAL FIELD

The disclosure generally relates to the use of a physically unclonable function.

BACKGROUND

A system's identity may be established and authenticated based on the unique physical properties of the system. In some applications, physically unclonable functions (PUFs) embodied in integrated circuits (ICs) are used to exploit the unique physical characteristics of a system for purposes of authentication. Each instance of the IC will have slightly different physical characteristics due to the random variation in an IC fabrication process. A PUF circuit uses the physical characteristics to generate an identifier value, for example a binary number, which differs from one integrated circuit to the next due to the different physical characteristics of each manufactured device. These identifier values may be used to uniquely identify the integrated circuit, as a key for encryption and decryption, or for other purposes. Examples of circuits used to implement PUFs include delay circuits and ring oscillators, memory circuits, and cross-coupled latches. The terms PUF circuit and PUF may be used interchangeably herein.

PUFs may operate according to a challenge-response protocol. The input to a PUF is the challenge, and the output from the PUF is the response. The slight variations between instances of the PUF circuits in different systems result in the separate instances providing different responses to the same challenge. In addition to identification and authentication, PUF circuits may be used to generate volatile secret keys.

Helper data is sometimes used to compensate for instability in a PUF circuit. Since a PUF circuit relies on a physical property of a device, a PUF value may not remain stable as the device and PUF circuit age. Since a changed PUF value may prevent authentication or communication, helper data in the form of error-correcting codes (ECGs) may be used to correct generated PUF values to the expected PUF value. While the helper data is useful in maintaining the viability of the PUF over the life of the device, the helper data may also reveal information about the PUF value. In addition, the helper data may be large and may create storage issues.

SUMMARY

According to one embodiment, a method of generating a selector map from a physically unclonable function (PUF) circuit includes generating a PUF value by the PUF circuit. The PUF value includes a plurality of bits. The method determines the stability of each bit of the plurality of bits of the PUF value by a generator circuit. The entries in a first subset of entries in the selector map in a memory are set to a first state by the generator circuit. The entries in the first subset correspond to a first subset of the plurality of bits of the PUF value. The entries in a second subset of entries in the selector map are set to a second state by the generator circuit. The second subset of entries correspond to a second subset of the plurality of bits of the PUF value. The first state of an entry in the selector map indicates the corresponding bit position of the PUF value is stable, and the second state in an entry in the selector map indicates the corresponding bit position of the PUF value is unstable.

In another embodiment, a circuit arrangement includes a physically unclonable function (PUF) circuit that is configured and arranged to generate a PUF initial value. A memory circuit is coupled to the PUF circuit and is configured with a selector map. The selector map includes a plurality of entries corresponding to respective bit positions of a plurality of bit positions of the PUF initial value. Each entry having a first state in the selector map indicates the corresponding bit position of the PUF initial value is stable, and each entry having a second state in the selector map indicates the corresponding bit position of the PUF initial value is unstable. A helper circuit is coupled to the memory circuit and to the PUF circuit. The helper circuit is configured and arranged to generate a PUF final value based on bits from the PUF initial value and states of the entries in the selector map.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

The disclosed methods and systems provide approaches for reducing the amount of storage required for ECCs used as helper data for physically unclonable functions (PUFs). According to one method, a selector map is generated for indicating stable and unstable bits in a PUF value generated by a PUF circuit. The selector map may be subsequently used in runtime operations for selecting only the stable bits of a PUF value for use by an application.

In generating a selector map, the stability of each bit of the PUF value is determined. The approach for determining stability depends on the type of PUF circuit used to generate the PUF value. Entries in the selector map correspond to bit positions of the PUF value generated by the PUF circuit, and the state of an entry indicates whether the corresponding bit position contains a stable or an unstable bit. For bits of the PUF value determined to be stable, the corresponding subset of entries in the selector map are set to a first state. For bits of the PUF value determined to be unstable, the corresponding subset of entries in the selector map are set to a second state. The first state in the selector map indicates the corresponding bit position of the PUF value is stable, and the second state in the selector map indicates the corresponding bit position of the PUF value is unstable.

In a circuit arrangement, a PUF circuit is configured and arranged to generate a PUF initial value. A selector map is stored in a memory circuit that is coupled to the PUF circuit. The selector map includes a plurality of entries corresponding to the bit positions of the PUF initial value. A helper circuit is configured and arranged to generate a PUF final value based on bits from the PUF initial value and states of the entries in the selector map.

Figure 1:
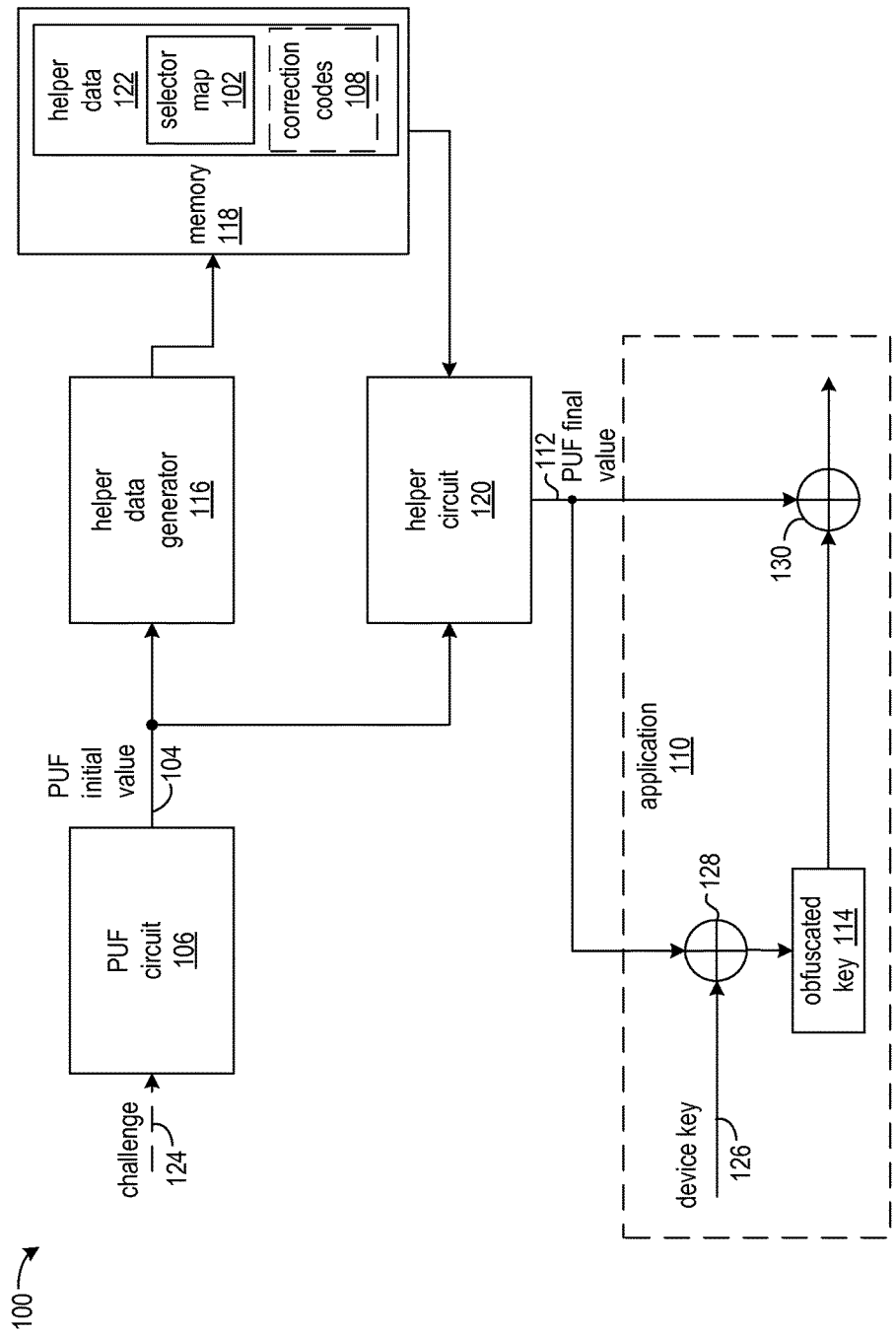
FIG. 1 shows an example of a circuit arrangement for generating a PUF value.

FIG. 1 shows an example of a circuit arrangement 100 for generating a PUF value. A selector map 102 is used to mask bits that have been determined to be unstable in a PUF initial value 104 generated by a PUF circuit 106. Error correction codes 108 may be optionally used in combination with the selector map. An application circuit 110 may use the PUF final value 112 to recover an obfuscated key 114, for example.

The helper data generator circuit 116 may be used to establish the selector map 102 and the error correction codes 108 in the memory 118 at some time prior to the application circuit 110 needing a PUF value. Once the selector map and the error correction codes have been established, the helper circuit 120 may use the PUF initial value from the PUF circuit 106 to provide a PUF final value to the application circuit 110 based on the selector map and error correction codes. Thus, the helper generator circuit 116 may be used in an initialization mode, and the helper circuit 120 may be used in a runtime mode.

Helper data 122 includes the selector map 102 and the error correction codes 108. The amount of storage needed for error correction codes may be reduced by using the selector map to indicate which bits of the PUF initial value are stable and can be used to generate the PUF final value, and which bits of the PUF initial value may be unstable and should be avoided in generating the PUF final value. In some implementations, the memory 118 for storing the helper data, the PUF circuit 106, helper data generator circuit 116, and helper circuit 120 may be implemented on the same integrated circuit (IC die). In other embodiments, if the helper data 122 becomes too large, the memory may be implemented in a separate IC die from the PUF circuit 106, helper data generator circuit 116, and helper circuit 120.

The helper data generator circuit 116 generates the helper data 122 from a PUF initial value provided by the PUF circuit 106. The helper data generator circuit generally tests the stability of bits of the PUF initial value output by the PUF circuit 106. In one approach, the helper data generator may use a threshold value to determine which bits of the PUF initial value are stable or unstable. Alternatively, the helper data generator circuit may determine which of the bits of the PUF initial value are least reliable, leaving some desired number of more stable bits for the PUF final value. Entries in the selector map 102 that correspond to bit positions of the stable bits of the PUF initial value are set to a first state, and entries in the selector map that correspond to bit positions of the unstable bits of the PUF initial value are set to a second state. Thus, the entries in the selector map having the first state correspond to bit positions of the PUF initial value having stable bit values, and entries in the selector map having the second state correspond to bit positions of the PUF initial value having unstable bit values.

Based on the bits of the PUF initial value 104 that the helper data generator circuit 116 determined to be stable, the helper data generator circuit generates a corresponding error correction codes 108 and stores the error correction code in the memory 118. The error correction coding scheme may depend on implementation requirements. Example error correction coding schemes include Reed-Solomon (RS), Bose-Chaudhuri-Hocquenghem (BCH), Hamming codes, orthogonal latin squares, etc.

The PUF circuit 106 may be a ring oscillator (RO) PUF, an arbiter PUF, or an SRAM PUF, for example. The challenge data 124 input to the PUF circuit is shown as a dashed line, because challenge data may not be required for a PUF, depending on the implementation.

Once the helper data has been established, the circuit arrangement 100 may be used in a runtime mode to generate a PUF value for an application circuit 110. The PUF circuit 106 outputs a PUF initial value 104, and the helper circuit 120 generates a PUF final value 112 based on the PUF initial value and the helper data 122. The helper circuit masks bits from the PUF initial value that correspond to entries in the selector map 102 having the state that indicates the bits are unstable, thereby selecting for the PUF final value only those bits of the PUF initial value that correspond to entries in the selector map having the state that indicates the bits are stable.

The helper circuit 120 also determines whether or not any of the stable bits in the PUF initial value are in error. That is, exclusive of the bits of the PUF initial value designated as being unstable by the selector map, the helper circuit detects whether or not the stable bits of the PUF initial value are in error. If an error is detected, the helper circuit uses the error correction codes 108 to correct the errant stable bit(s).

The example application circuit 110 uses the PUF final value 112 for key obfuscation. For example, the application circuit 110 may include circuitry implemented as a system on a chip, and a device key 126 may be input to the system as part of a configuration process using a boundary scan or another known or proprietary configuration protocol. To obscure the device key, the device key is transformed using the PUF final value 112. The transformation circuit 128 may encrypt the device key using the PUF final value as the key-encryption-key or may XOR the device key with the PUF final value. The obscured key as output by the transformation circuit is stored in register 114. To recover the obscured key, such as when the application needs the key for an AES decryptor, the obfuscated key is decrypted/XORed with the PUF final value 112 by transformation circuit 130.

Though not shown, it will appreciated that bits of the PUF initial value may be stored in a register for further processing by the helper data generator. Similarly, the bits of the PUF final value may be registered for processing by the application circuit 110.

Figure 2:
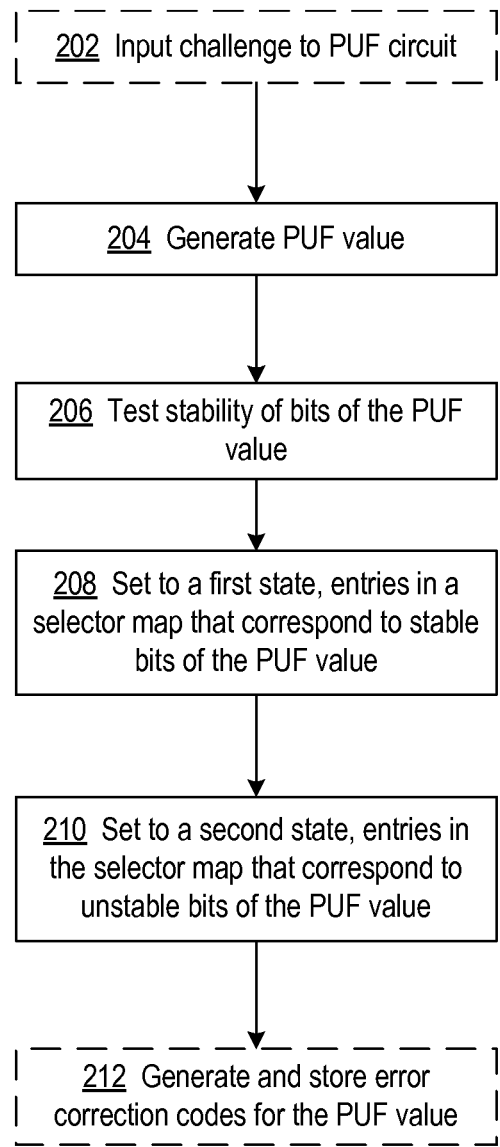
FIG. 2 shows a flowchart of a process for generating a selector map.

FIG. 2 shows a flowchart of a process for generating a selector map. Depending on the type of PUF circuit, challenge data is optionally input to a PUF circuit at block 202. For example, RO PUFs and arbiter PUFs typically respond to challenge data, whereas challenge data is not required for an SRAM PUF to generate a PUF value. Block 202 is dashed as the challenge data is not required for some implementations. At block 204, the PUF value is generated by the PUF circuit, which may be an RO PUF, an arbiter PUF, or an SRAM PUF, for example.

The stability of the bits of the PUF value is determined at block 206. In an RO oscillator, for example, the stability of a PUF bit may be determined by the magnitude of the difference between the counts of oscillations of the signals produced by two ring oscillators that are selected to construct the bit value for the PUF bit. In an arbiter PUF, the stability of a PUF bit may be determined by the magnitude of the difference in delays between two delay paths selected to construct the value for the PUF bit. In an SRAM PUF, the stability of a PUF bit may be determined by comparing the bit value of the bit over some number of power-on/power-off cycles of the SRAM PUF.

At block 208, the states of entries in the selector map that correspond to bit positions of the PUF value for the bits determined to be stable are set to a first state. The first state indicates that the bits at the corresponding bit positions are stable. At block 210, the states of entries in the selector map that correspond to bit positions of the PUF value for the bits determined to be unstable are set to a second state. The second state indicates that the bits at the corresponding bit positions are unstable. In an example implementation, the selector map may be a bit map in which each bit of the bit map corresponds to one of the positions of the PUF value.

ECCs are optionally generated for the PUF value at block 212. The ECCs are generated from those bits of the PUF value determined to be stable, exclusive of the bits of the PUF value determined to be unstable. That is, the bits of the PUF value determined to be unstable are not used in computing the ECCs. Only the bits of the PUF value determined to be stable are used in computing the ECCs.

The selector map and the ECCs may be stored in the same memory or in separate memories. Also, the selector map and ECCs may be stored in a memory on the same IC die as the PUF circuit or in a memory on an IC die separate and distinct from the IC die of the PUF circuit.

Figure 3:
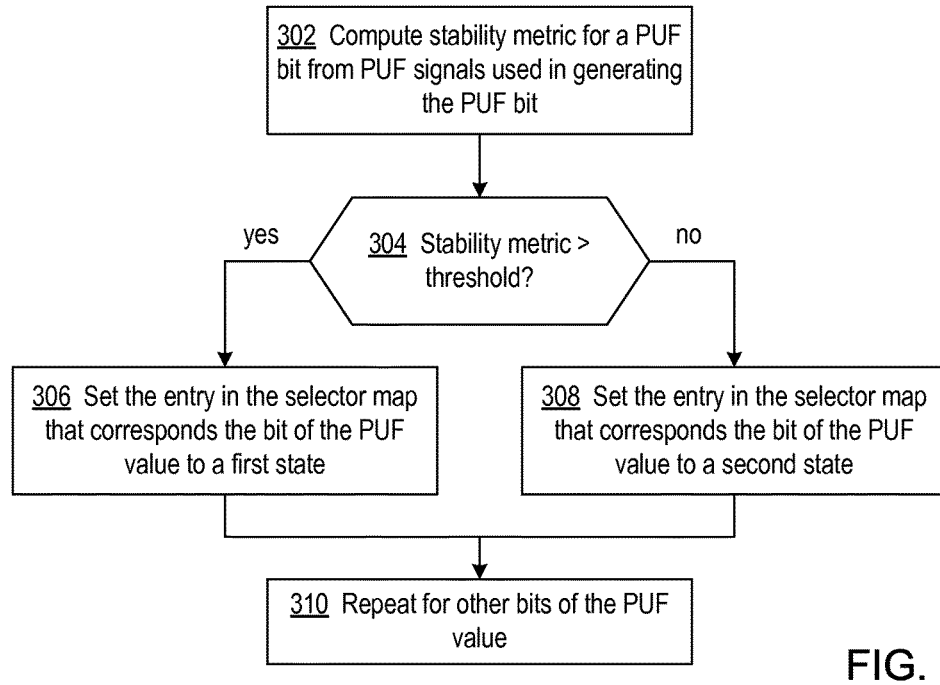
FIG. 3 shows a flowchart of a process for testing the stability of bits of a PUF value.
Figure 4:
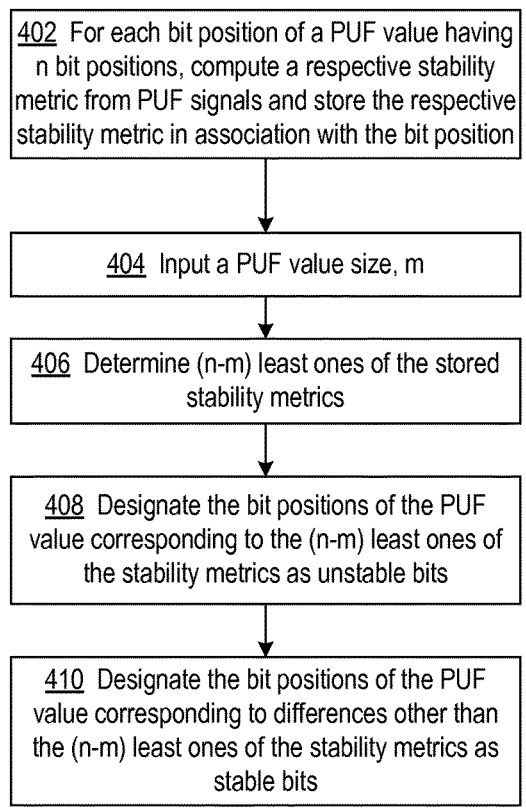
FIG. 4 shows a flowchart of an alternative process for testing the stability of bits of a PUF value.

FIGS. 3 and 4 show examples of two approaches for determining which subset of bits of a PUF value are stable and which bits of a PUF value are unstable. In FIG. 3, a threshold value is used to distinguish between stable and unstable bits of the PUF value. In FIG. 4, the process determines the least stable bits of the PUF value, and designates bits at those bit positions as being unstable.

FIG. 3 shows a flowchart of a process for testing the stability of bits of a PUF value. The process of FIG. 3 compares a threshold value to differences between signals from the PUF circuit used to generate the bits of the PUF value. Generally, the process evaluates PUF signals used in generating the PUF bits. If the difference between the signals is greater than a threshold value, the corresponding entry in the selector map is set to the first state, which indicates the bit at that bit position is stable. If the difference between the signals is not greater than the threshold value, the corresponding entry in the selector map is set to the second state, which indicates the bit at that bit position is unstable.

At block 302, a stability metric is computed for a PUF bit from signals used in generating the PUF bit. In an RO PUF, the stability metric may be the difference between the count values of two ring oscillators; in an arbiter PUF, the stability metric may be the difference between the delays introduced by two delay paths; and in an SRAM PUF, the stability metric may be a count of the number of times the bit had the same value over a number of power-on/power-off cycles. A stability metric may be generated by generating the initial PUF value multiple times, optionally with different voltage and temperature, and determining for each bit of the PUF how often the bit is the same. Bits that do not change over repeated generations and at different temperature and voltage may be considered more stable and thus have a greater stability metric.

If the stability metric is greater than a threshold value, decision block 304 directs the process to block 306, at which the entry in the selector map that corresponds to the bit position of the bit under consideration in the PUF value is set to the first state. The first state indicates that the bit at the corresponding bit position of the PUF value is stable. If the stability metric is not greater than the threshold value, decision block 304 directs the process to block 308, at which the entry in the selector map that corresponds to the bit position of the bit under consideration in the PUF value is set to the second state. The second state indicates that the bit at the corresponding bit position of the PUF value is unstable. Block 310 indicates that the process may be repeated for other bits of the PUF value.

FIG. 4 shows a flowchart of an alternative process for testing the stability of bits of a PUF value. The process of FIG. 4 evaluates the stability of the bits in the PUF value, determines the least stable bits of the PUF value, and designates bits at those bit positions as being unstable.

At block 402, respective stability metrics are computed for the bits of a PUF value. That is, for each bit position of the PUF value, a respective stability metric is computed and stored in association with the bit position. Each respective stability metric indicates a level of stability expected from a bit at the corresponding bit position of the PUF value. The stability metrics may be computed for RO PUFs, arbiter PUFs, and SRAM PUFs as described above.

A parameter value indicating the desired number of bits in a PUF final value is input at block 404. The parameter value may be particular to the application circuitry that relies on the PUF final value. A smaller parameter value relative to a total number of bits output by the PUF circuit would result in more of the least stable bits of the PUF value being designated as unstable, possibly leaving the most stable bits of the PUF value for the PUF final value and requiring less storage for ECCs. A larger parameter value relative to a total number of bits output by the PUF circuit would result in fewer of the least stable bits of the PUF value being designated as unstable, possibly leaving lesser stable bits of the PUF value for the PUF final value and requiring more storage for ECCs.

At block 406, the process determines the least stable bits of the PUF value output by the PUF circuit using the stored stability metrics associated with the bits. For example, if the PUF value output by the PUF circuit includes n bits, and the parameter value indicating the desired number of bits in the PUF final value is m, block 406 determines the (n−m) least ones of the stability metrics. That is, the stability metrics may be segregated into disjoint subsets, with a first subset including the (n−m) least ones of the stability metrics, and the second subset including the other m of the stability metrics. Each stability metric in the first subset is less than or equal to every stability metric in the second subset.

The bit positions in the PUF value that correspond to the (n−m) least ones of the stability metrics are designated as unstable at block 408. For example, entries in the selector map that correspond to the (n−m) least ones of the stability metrics may be set to a first state. At block 410, the bit positions in the PUF value that correspond to the remaining m stability metrics are designated as stable. For example, entries in the selector map that correspond to the m stability metrics may be set to a second state.

Figure 5:
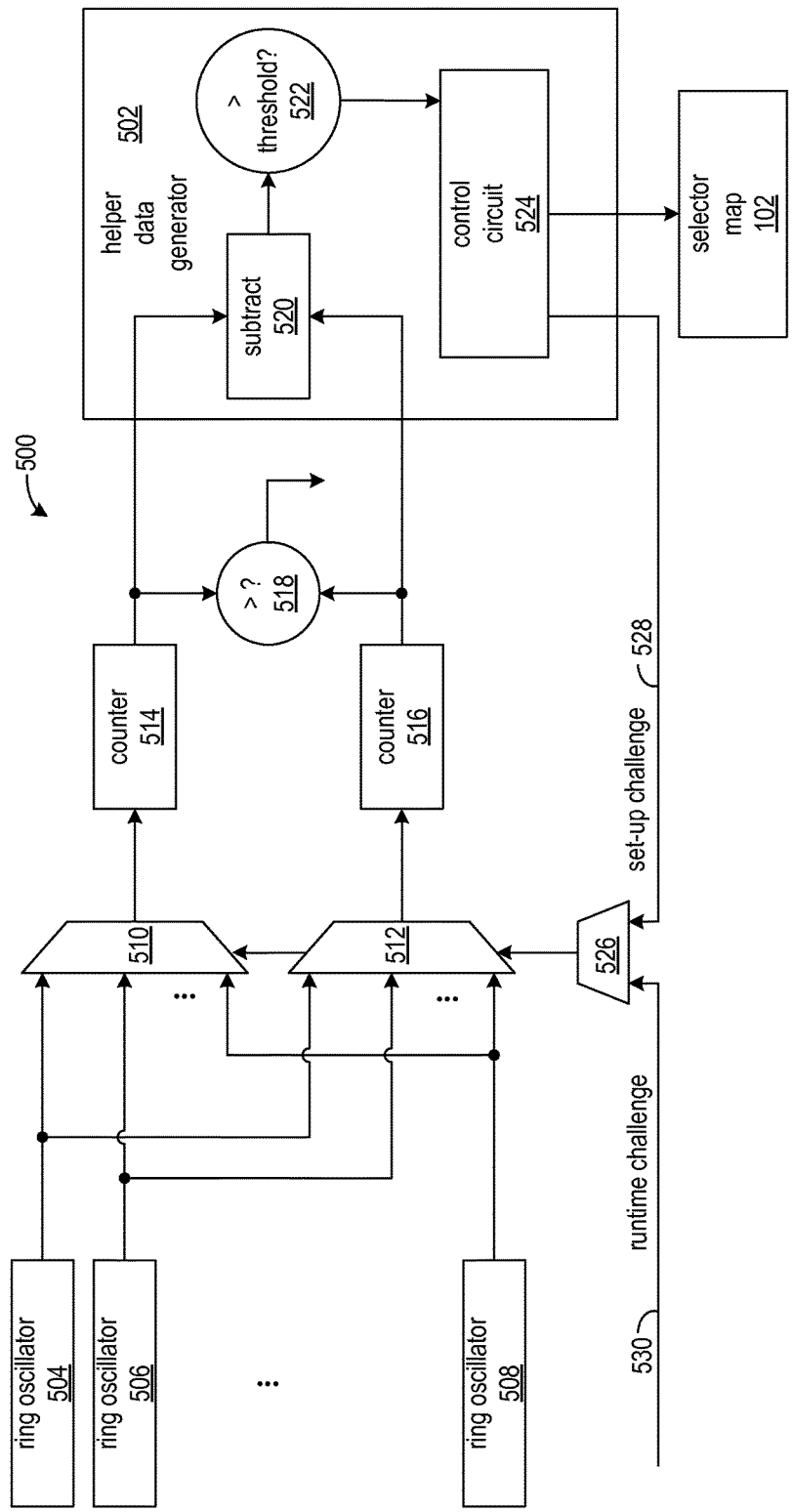
FIG. 5 shows an example of a circuit arrangement that includes an RO PUF circuit and a helper data generator circuit that constructs the selector map.

FIG. 5 shows an example of a circuit arrangement 500 that includes an RO PUF circuit and a helper data generator circuit 502 that constructs the selector map 102. The RO PUF circuit includes multiple ring oscillators, examples of which include ring oscillators 504, 506, and 508, multiplexers 510 and 512, counters 514 and 516, and comparison circuit 518. The helper data generator circuit includes a subtractor circuit 520, a comparison circuit 522, and a control circuit 524. Multiplexer 526 may be used to control whether the RO PUF circuit operates in a set-up mode or in a runtime mode. During set-up mode, the helper generator circuit initializes the selector map based on set-up challenge data 528 to the RO PUF circuit. During runtime mode, the output from the PUF circuit is used based on runtime challenge data 530.

Output signals from the ring oscillators 504, 506, through 508 are input to both of the multiplexers 510 and 512. The selection of signals by the multiplexers 510 and 512 is made by the challenge data provided by the multiplexer 526. The challenge data as provided in respective signals to the selection inputs of the multiplexers 510 and 512, cause the multiplexers to select different signals from different oscillators. For example, for one bit of the PUF value, the challenge data may cause multiplexer 510 to select the signal from ring oscillator 504 and multiplexer 512 to select the signal from ring oscillator 508.

The oscillations/cycles of the selected signals occurring over a period of time are counted by counters 514 and 516, respectively. The count values are compared by comparison circuit 518. The output of the comparison circuit, which is the value of the PUF bit, depends on which count value is greater. For example, if the count value from counter 516 is greater than the count value from counter 514, a logic one may be output by the comparison circuit 518. Otherwise, a logic zero is output. For run-time operation, the output from the comparison circuit would be used as one bit of the PUF value. For set-up and initialization operations, the output from the comparison circuit may be discarded. Different challenge data may be successively input to generate different bits of the PUF value. Alternatively, the RO PUF circuitry may be replicated and bits of the PUF value generated in parallel.

The helper data generator circuit 502 initializes the selector map based on output signals from the counters 514 and 516. The subtractor circuit 520 computes the difference between the count value from counter 514 and the count value from counter 516 and provides the absolute value of the difference to the comparison circuit 522. The comparison circuit compares the absolute value of the difference to a threshold value and outputs a signal to the control circuit 524 indicating the result of the comparison. If the absolute value of the difference is greater than the threshold value, the comparison circuit 522 outputs a signal having a first state, and otherwise outputs the signal having a second different state. A larger difference between the oscillation counts of the signals from two ring oscillators indicates that the relationship between the counts is expected to be stable over some period of time.

If the absolute value of the difference is greater than the threshold value as indicated by the state of the signal from the comparison circuit, the bit position in the PUF value of the bit produced by the set-up challenge data 528 is deemed to be stable by the control circuit 524. If the absolute value of the difference is not greater than the threshold value as indicated by the state of the signal from the comparison circuit, the bit position in the PUF value of the bit produced by the set-up challenge data is deemed to be unstable by the control circuit. An entry in the selector map corresponding to the bit position determined to be stable is set to a state by the control circuit to indicate whether the bit is stable or unstable.

Figure 6:
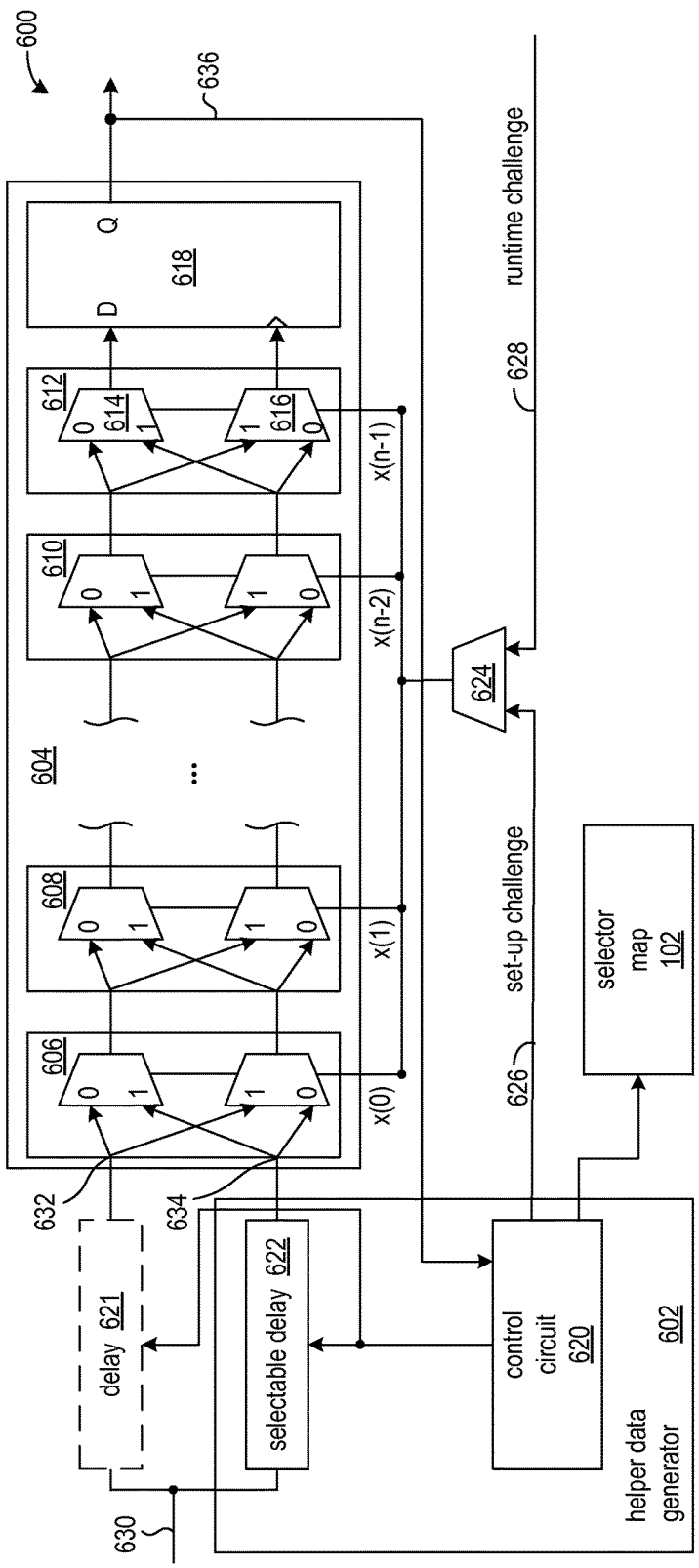
FIG. 6 shows an example of a circuit arrangement that includes an arbiter PUF circuit for generating a PUF value and a helper data generator circuit that constructs the selector map.

FIG. 6 shows an example of a circuit arrangement 600 that includes an arbiter PUF circuit for generating a PUF value and a helper data generator circuit 602 that constructs the selector map 102. The PUF circuit is an arbiter delay circuit 604 that includes multiple delay elements. There are n delay elements, with delay elements shown as blocks 606, 608, 610, and 612.

Each delay element includes respective upper and lower multiplexers. For example, the last delay element 612 includes upper multiplexer 614 and lower multiplexer 616. The arbiter delay circuit 604 includes register 618 that captures the state of the signal output from the delay path having upper multiplexer 614 as the last element, with the register 618 enabled by the output of the delay path having lower multiplexer 616 as the last element. The output value from the register 618 is one bit of the PUF value and corresponds to a position of the PUF value and the associated challenge data.

The helper data generator circuit 602 includes a control circuit 620, an optional delay circuit 621, and a selectable delay circuit 622. Delay circuit 621 may provide a fixed delay or a selectable delay and may be used to explore delays in scenarios in which the lower path is faster than the upper path. Multiplexer 624 may be used to control whether the arbiter PUF circuit operates in a set-up mode or in a runtime mode. During set-up mode, the helper generator circuit initializes the selector map 102 based on set-up challenge data 626 to the arbiter PUF circuit. During runtime mode, the output from the PUF circuit is generated in response to runtime challenge data 628.

During runtime mode, the control circuit 620 controls the selectable delay circuit 622 such that identical delays are introduced into the input signal 630 prior to input to delay element 606. That is, signal 630 appears the same at input pins 632 and 634 of delay element 606. Also during runtime mode, the multiplexer 624 is controlled to select runtime challenge data 628 for input to the control pins of the upper and lower multiplexers in the delay elements. The challenge data effectively constructs different paths for the signals appearing at input pins 632 and 634 through the delay elements 606, 608, . . . 610, and 612. Depending on the challenge data, in one delay element the signal introduced at pin 632 may be selected by the upper multiplexer, and the signal introduced at pin 634 may be selected by the lower multiplexer. In another of the delay elements, the selection may be reversed. Different challenge data results in different delay paths, with each set of challenge data corresponding to one bit position and resulting in one bit of a PUF value.

During set-up mode, the selectable delay circuit 622 may be controlled to determine the difference between the delay of the delay path that begins at pin 632 and the delay path that begins at pin 634. The same set-up challenge data may be supplied to the arbiter delay circuit 604 by the control circuit 620 over repeated iterations, with the control circuit adjusting the amount of delay introduced by the selectable delay circuit 622 by a different amount in each iteration. By selecting a delay greater or less than the delay of delay circuit 621, the sensitivity of the PUF can be determined. The difference in delays may be the difference between the upper and lower limits of the delay provided by the selectable delay circuit at which the control circuit detects that the output signal 636 from the arbiter delay circuit 604 changes value.

The control circuit 620 checks whether or not the determined difference in delays is greater than a threshold value. If the difference is greater than a threshold value, the bit position in the PUF value of the bit produced by the set-up challenge data 628 is deemed to be stable by the control circuit 620. If the difference is not greater than the threshold value, the bit position in the PUF value of the bit produced by the set-up challenge data is deemed to be unstable by the control circuit. An entry in the selector map 102 corresponding to the bit position determined to be stable is set to a state by the control circuit to indicate whether the bit is stable or unstable.

Figure 7:
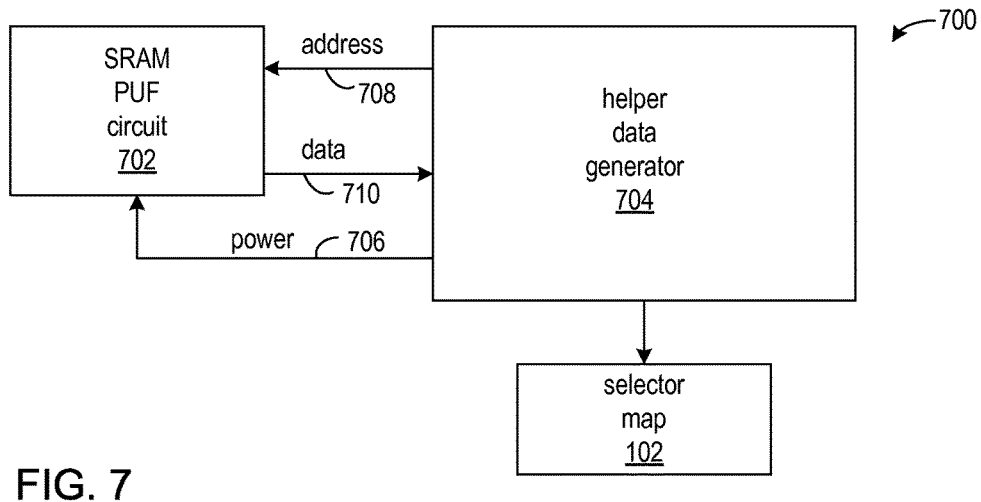
FIG. 7 shows an example of a circuit arrangement that includes an SRAM PUF circuit for generating a PUF value and a helper data generator circuit that constructs the selector map.

FIG. 7 shows an example of a circuit arrangement 700 that includes an SRAM PUF circuit 702 for generating a PUF value and a helper data generator circuit 704 that constructs the selector map 102. The SRAM PUF circuit includes a number of memory cells, the states of which are used in generating a PUF value. The helper data generator circuit controls power to the SRAM PUF circuit and determines the stability of bits of the PUF value by repeatedly cycling power on and power off to the SRAM PUF circuit and comparing values of the bits from the memory cells across the power cycles.

The helper data generator circuit 704 controls power to the SRAM PUF circuit via power line 706. After the SRAM PUF circuit has been powered on by the helper data generator circuit and before any further access to the memory elements, the helper data generator circuit inputs address signals to the SRAM PUF circuit on line 708. In response to the input address, the SRAM PUF circuit outputs the addressed data on line 710. The data on line 710 is the PUF value. The helper data generator stores the PUF value and then powers off the SRAM PUF circuit. The helper data generator circuit repeats the process of powering on the SRAM PUF circuit, reading the PUF value, storing the PUF value, and powering off the SRAM PUF circuit some number of times. The number of times the process is repeated may depend on the technology used to implement the SRAM PUF circuit.

Once the helper data generator circuit 704 has repeated the process of powering on the SRAM PUF circuit 702, reading the PUF value, storing the PUF value, and powering off the SRAM PUF circuit the desired number of times, the helper data generator circuit evaluates the values of each bit in the stored PUF values.

For each bit position of the PUF values, if the bit value is the same in all the stored PUF values, the helper data generator circuit 704 sets the corresponding entry in the selector map to a first state. The first state indicates that the bit at the corresponding bit position in the PUF value is stable. If the bit value is not constant in all the stored PUF values, the helper data generator circuit sets the corresponding entry in the selector map to a second state. That is, if the bit value is different in at least two of the stored PUF values, the helper data generator circuit sets the corresponding entry in the selector map to a second state. The second state indicates that the bit at the corresponding bit position in the PUF value is unstable.

Figure 8:
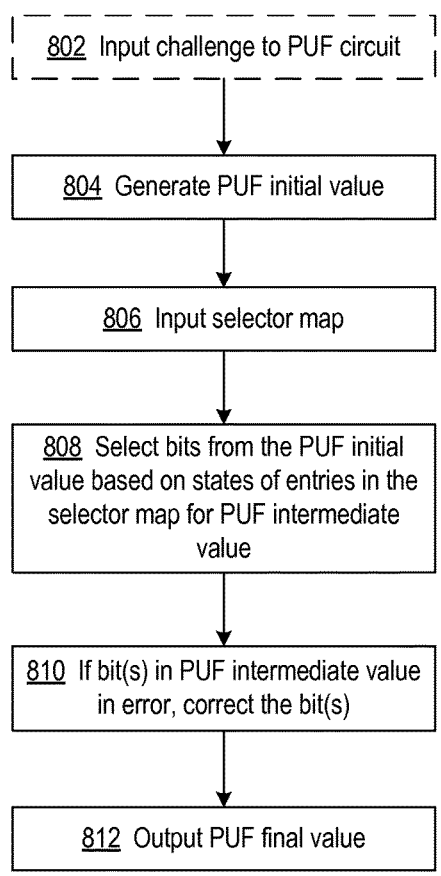
FIG. 8 shows a flowchart of a process for generating a PUF final value using a selector map that indicates stable PUF bits of a PUF initial value generated by a PUF circuit.

FIG. 8 shows a flowchart of a process for generating a PUF final value using a selector map that indicates stable PUF bits of a PUF initial value generated by a PUF circuit. At block 802, challenge data is optionally input to the PUF circuit. The challenge data is optional, in that not all PUF circuits require challenge data. A PUF initial value is generated by the PUF circuit at block 804.

A selector map is input at block 806. The selector map may be read from a memory and includes entries corresponding to respective bit positions of the bit positions of the PUF initial value output by the PUF circuit. Each entry in the selector map having a first state indicates a corresponding bit position of the PUF initial value is stable. Each entry in the selector map having a second state indicates the corresponding bit position of the PUF initial value is unstable.

At block 808, the process selects bits from the PUF initial value based on the states of the entries in the selector map. Those bits in the bit positions of the PUF initial value that correspond to entries in the selector map having the first state (the stable bits) are the bits selected in block 808. The bits in the bit positions of the PUF initial value that correspond to entries in the selector map having the second state (the unstable bits) are ignored. The selected bits may be referred to as a PUF intermediate value, which is error corrected at block 810. At block 810, ECCs are input, and if the PUF intermediate value has any bits in error, the PUF intermediate value is corrected according to the ECCs associated with the PUF value. The corrected PUF intermediate value is output as the PUF final value at block 812.

The PUF circuits may be implemented in programmable logic or in application specific circuitry, depending on implementation requirements. The logic of the helper data generator and helper functions may be implemented in programmable logic, application specific circuitry, as a processor specifically programmed to perform the described processes, or with a combination of programmable logic, application specific circuitry, and/or a programmed processor.

Figure 9:
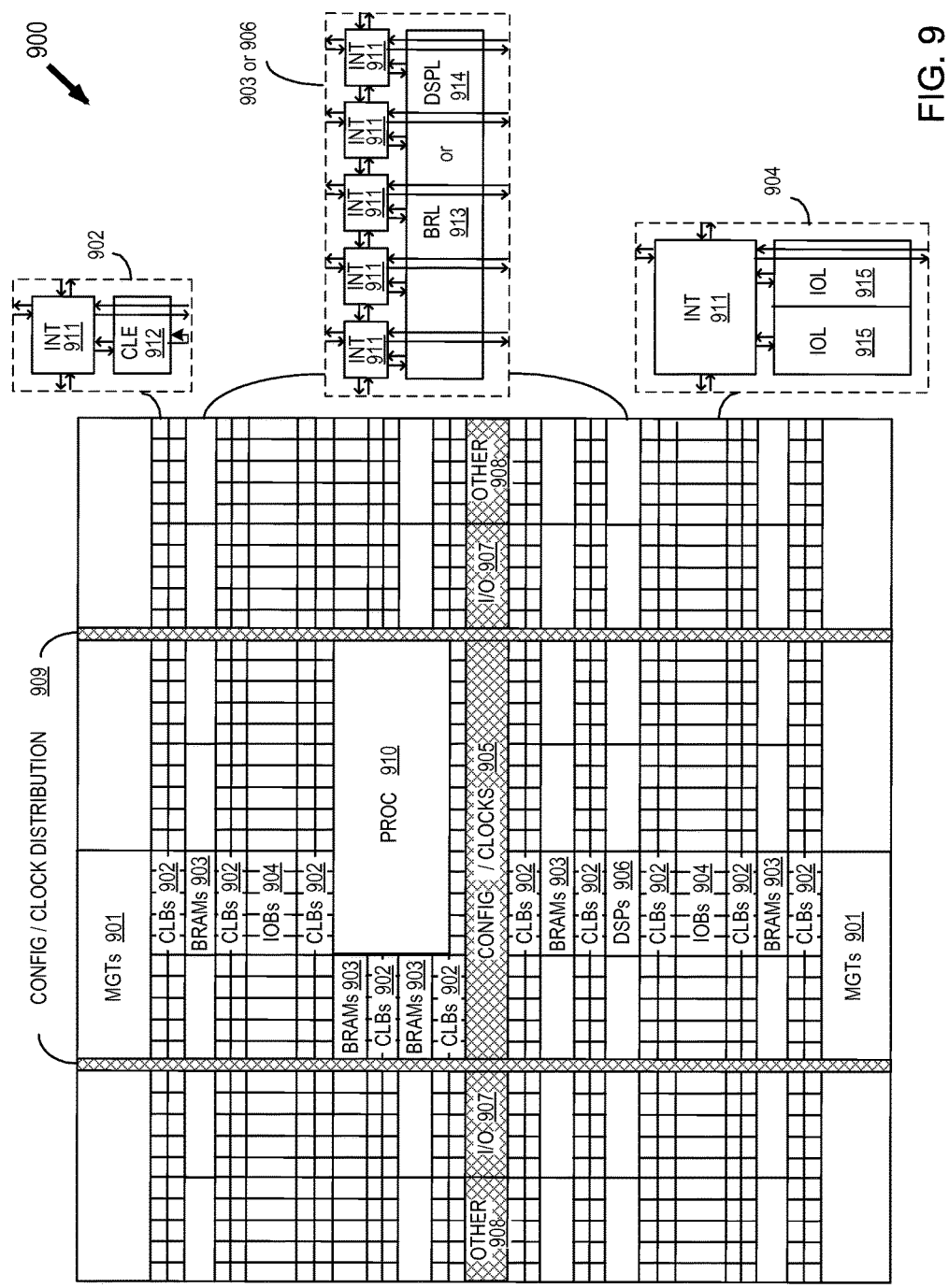
FIG. 9 shows a programmable integrated circuit (IC) on which the disclosed circuits and processes may be implemented.

FIG. 9 shows a programmable integrated circuit (IC) 900 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 9 illustrates programmable IC 900 that includes a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907, for example, clock ports, and other programmable logic 908 such as digital clock managers, analog-to-digital converters, system monitoring logic, and so forth. Some programmable IC having FPGA logic also include dedicated processor blocks (PROC) 910 and internal and external reconfiguration ports (not shown).

In some FPGA logic, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA logic. The programmable interconnect element INT 911 also includes the connections to and from the programmable logic element within the same tile, as shown by the examples included at the top of FIG. 9.

For example, a CLB 902 can include a configurable logic element CLE 912 that can be programmed to implement user logic, plus a single programmable interconnect element INT 911. A BRAM 903 can include a BRAM logic element (BRL) 913 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element (DSPL) 914 in addition to an appropriate number of programmable interconnect elements. An IOB 904 can include, for example, two instances of an input/output logic element (IOL) 915 in addition to one instance of the programmable interconnect element INT 911. As will be clear to those of skill in the art, the actual I/O bond pads connected, for example, to the I/O logic element 915, are manufactured using metal layered above the various illustrated logic blocks, and typically are not confined to the area of the input/output logic element 915.

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 9 include additional logic blocks that disrupt the regular columnar structure making up a large part of the programmable IC. The additional logic blocks can be programmable blocks and/or dedicated logic. For example, the processor block PROC 910 shown in FIG. 9 spans several columns of CLBs and BRAMs.

Note that FIG. 9 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual programmable IC, more than one adjacent column of CLBs is typically included wherever the CLBs appear, to facilitate the efficient implementation of user logic.

Figure 10:
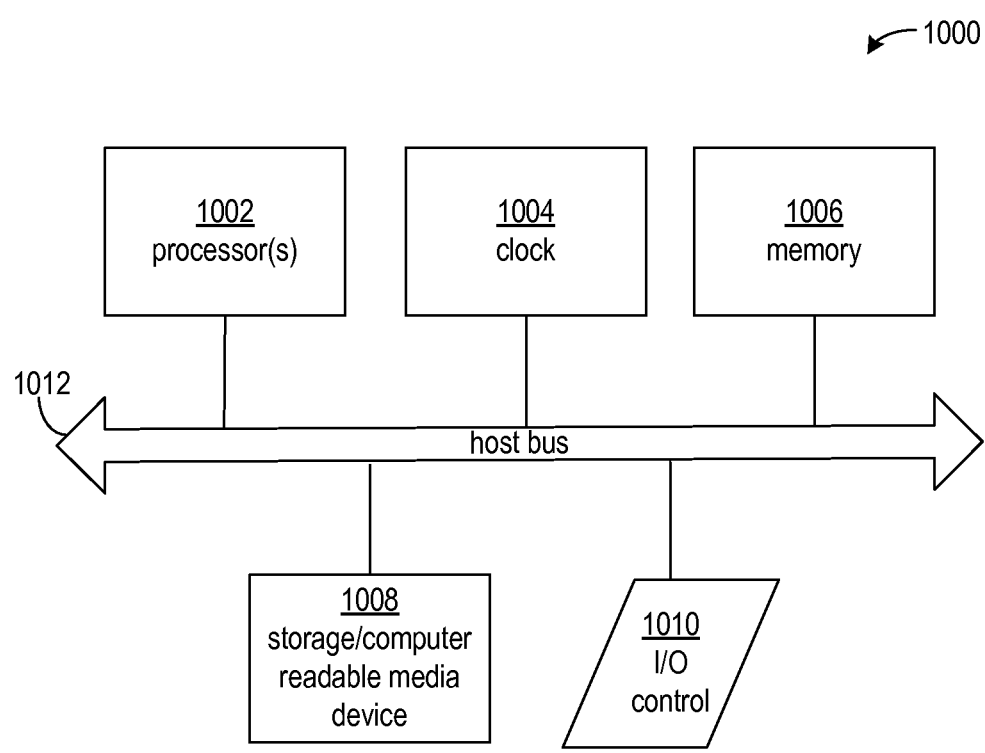
FIG. 10 shows a block diagram of an example computing arrangement that may be configured to implement the data structures and processes described herein.

FIG. 10 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 1000 includes one or more processors 1002, a clock signal generator 1004, a memory arrangement 1006, a storage arrangement 1008, and an input/output control unit 1010, all coupled to a host bus 1012. The arrangement 1000 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 1002 may be one or more general purpose processors, or a combination of one or more general purpose processors and suitable co-processors, or one or more specialized processors (e.g., RISC, CISC, pipelined, etc.).

The memory arrangement 1006 typically includes multiple levels of cache memory, and a main memory. The storage arrangement 1008 may include local and/or remote persistent storage, such as provided by magnetic disks (not shown), flash, EPROM, or other non-volatile data storage. The storage unit may be read or read/write capable. Further, the memory arrangement 1006 and storage arrangement 1008 may be combined in a single arrangement.

The processor(s) 1002 executes the software in storage arrangement 1008 and/or memory arrangement 1006, reads data from and stores data to the storage arrangement 1008 and/or memory arrangement 1006, and communicates with external devices through the input/output control arrangement 1010. These functions are synchronized by the clock signal generator 1004. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination. The methods and system are thought to be applicable to a variety of systems employing PUFs. Other aspects and features will be apparent to those skilled in the art from consideration of the specification. It is intended that the specification and drawings be considered as examples only, with a true scope of the invention being indicated by the following claims.

What is claimed is:

1. A method of generating a selector map from a physically unclonable function (PUF) circuit, wherein the PUF circuit includes a plurality of ring oscillators, comprising:
   generating a PUF initial value by the PUF circuit, the PUF value including a plurality of n bits, wherein the generating includes for each bit of the plurality of bits:
      inputting challenge data to the PUF circuit,
      counting a first number of cycles of a PUF signal output from a first ring oscillator of the plurality of ring oscillators and counting a second number of cycles of a PUF signal output from a second ring oscillator of the plurality of ring oscillators,
      subtracting the first number of cycles from the second number of cycles to produce a difference,
      determining a respective stability metric of each bit of the plurality of bits of the PUF initial value by a generator circuit as a function of a magnitude of the difference, and
      storing the respective stability metric in association with the bit position;
   inputting a PUF value size, m, indicating a number of PUF bits required in a PUF final value, wherein n and m are integers greater than 0, and n is greater than m;
   determining, from the n stability metrics stored in association with the bit positions of the PUF initial value, (n−m) least stable ones of the n bits;
   setting a first subset of entries in the selector map in a memory to a first state by the generator circuit, the first subset of entries corresponding to a first subset of the plurality of bits of the PUF initial value;
   wherein the first subset of entries in the selector map includes m entries that correspond to m of the respective bit positions of the PUF initial value that are associated with m of the n stability metrics other than the bit positions of the PUF initial value that are associated with the (n−m) least stable ones of the n bits;
   setting a second subset of entries in the selector map to a second state by the generator circuit, the second subset of entries corresponding to a second subset of the plurality of bits of the PUF initial value;

wherein the first state of an entry in the selector map indicates a corresponding bit position of the PUF initial value is stable, and the second state of an entry in the selector map indicates a corresponding bit position of the PUF initial value is unstable; and wherein the second subset of entries in the selector map includes (n−m) entries that correspond to (n−m) of the respective bit positions of the PUF initial value that are associated with the (n−m) least stable ones of the n bits.

2. The method of claim 1, further comprising, for each respective bit position of a plurality of bit positions of the PUF initial value:

wherein the setting the first subset of entries in the selector map to the first state includes setting an entry of the first subset of entries to the first state in response to an absolute value of the difference being greater than a threshold value; and wherein the setting the second subset of entries to the second state includes setting an entry of the second subset of entries to the second state in response to the absolute value of the difference being less than the threshold value.

3. The method of claim 2, wherein the inputting of the challenge data includes applying respective signals to selection inputs of a pair of multiplexers that are coupled to the plurality of ring oscillators.

4. The method of claim 1, wherein:
the PUF circuit is implemented on a first integrated circuit (IC) die; and
the method further comprises storing the selector map on a second IC die.

5. The method of claim 1, further comprising:
generating an error correction code (ECC) from the first subset of the plurality of bits of the PUF initial value, exclusive of the second subset of the plurality of bits of the PUF initial value; and
storing the ECC in a memory.

6. The method of claim 1, further comprising:
generating an error correction code (ECC) from m bits of the PUF initial value corresponding to the m bits indicated by the selector map, exclusive of (n−m) bits of the PUF initial value corresponding to the (n−m) bit positions of the PUF initial value indicated by the selector map; and
storing the ECC in a memory.

7. A method of generating a selector map from a physically unclonable function (PUF) circuit, comprising:
generating a PUF initial value by the PUF circuit, the PUF initial value including a plurality of bits;
for each bit position of a plurality, n, of bit positions of the PUF initial value:
  computing by a generator circuit, a respective stability metric from PUF signals generated by the PUF circuit; and
  storing the respective stability metric in association with the bit position;
inputting a PUF value size, m, indicating a number of PUF bits required in a PUF final value, wherein n and m are integers greater than 0, and n is greater than m;
determining, from the n stability metrics stored in association with the bit positions of the PUF initial value, (n−m) least stable ones of the n bits;
setting a first subset of entries in the selector map in a memory to a first state by the generator circuit, the first subset of entries corresponding to a first subset of the plurality of bits of the PUF initial value;

wherein the first subset of entries in the selector map includes m entries that correspond to m of the respective bit positions of the PUF initial value that are associated with m of the n stability metrics other than the bit positions of the PUF value that are associated with the (n−m) least stable ones of the n bits;

setting a second subset of entries in the selector map to a second state by the generator circuit, the second subset of entries corresponding to a second subset of the plurality of bits of the PUF initial value;

wherein the second subset of entries in the selector map includes (n−m) entries that correspond to (n−m) of the respective bit positions of the PUF initial value that are associated with the (n−m) least stable ones of the n bits;

wherein the first state of an entry in the selector map indicates a corresponding bit position of the PUF initial value is stable, and the second state of an entry in the selector map indicates a corresponding bit position of the PUF initial value is unstable.

8. The method of claim 7, further comprising:
generating an error correction code (ECC) from m bits of the PUF initial value corresponding to the m bits indicated by the selector map, exclusive of (n−m) bits of the PUF initial value corresponding to the (n−m) bit positions of the PUF initial value indicated by the selector map; and
storing the ECC in a memory.

9. A circuit arrangement, comprising:
a physically unclonable function (PUF) circuit, the PUF circuit configured and arranged to generate a PUF initial value, the PUF initial value including a plurality of bits;
a memory circuit coupled to the PUF circuit;
a helper generator circuit coupled to the PUF circuit and to the memory circuit, the helper generator circuit configured and arranged to:
for each bit position of a plurality, n, of bit positions of the PUF initial value:
  compute a respective stability metric from PUF signals generated by the PUF circuit; and
  store the respective stability metric in association with the bit position;
input a PUF value size, m, indicating a number of PUF bits required in a PUF final value, wherein n and m are integers greater than 0, and n is greater than m;
determine, from the n stability metrics stored in association with the bit positions of the PUF initial value, (n−m) least stable ones of the n bits;
set a first subset of entries in a selector map in the memory circuit to a first state, the first subset of entries corresponding to a first subset of the plurality of bits of the PUF initial value;
wherein the first subset of entries in the selector map includes m entries that correspond to m of the respective bit positions of the PUF initial value that are associated with m of the n stability metrics other than the bit positions of the PUF value that are associated with the (n−m) least stable ones of the n bits;
set a second subset of entries in the selector map to a second state, the second subset of entries corresponding to a second subset of the plurality of bits of the PUF initial value; and
wherein the second subset of entries in the selector map includes (n−m) entries that correspond to (n−m) of the respective bit positions of the PUF initial value that are associated with the (n−m) least ones of the n stability metrics; and a helper circuit coupled to the memory circuit and to the PUF circuit, the helper circuit configured and arranged to:

read entries of the selector map from the memory circuit; and generate a PUF final value based on bits from the PUF initial value and states of the entries in the selector map.

10. The circuit arrangement of claim 6, wherein the helper circuit is further configured and arranged to select, from the PUF initial value, bits that correspond to entries in the selector map having the first state.

11. The circuit arrangement of claim 9, wherein the PUF circuit includes a plurality of ring oscillators.

12. The circuit arrangement of claim 9, wherein the PUF circuit includes an arbiter delay circuit.

13. The circuit arrangement of claim 9, wherein the PUF circuit is an SRAM PUF circuit.

14. The circuit arrangement of claim 9, wherein the helper generator circuit is further configured and arranged to:

generate an error correction code (ECC) from m bits of the PUF initial value corresponding to the m bits indicated by the selector map, exclusive of (n−m) bits of the PUF initial value corresponding to the (n−m) bit positions of the PUF initial value indicated by the selector map; and store the ECC in the memory circuit.

15. The circuit arrangement of claim 14, wherein:

the helper circuit is further configured and arranged to:

detect an error in the PUF initial value from the bits of the PUF initial value corresponding to bits in the selector map having the first state, exclusive of bits of the PUF initial value corresponding to bits in the selector map having the second state; and correct, using the ECC, the bits of the PUF initial value corresponding to bits in the selector map having the first state, exclusive of bits of the PUF initial value corresponding to bits in the selector map having the second state.

\* \* \* \* \*